US011003718B2

(12) United States Patent
McLean et al.

(10) Patent No.: US 11,003,718 B2
(45) Date of Patent: May 11, 2021

(54) SYSTEMS AND METHODS FOR ENABLING A GLOBAL AGGREGATED SEARCH, WHILE ALLOWING CONFIGURABLE CLIENT ANONYMITY

(71) Applicant: Secureworks Corp., Wilmington, DE (US)

(72) Inventors: Lewis McLean, Edinburgh (GB); Paul Stansell, Edinburgh (GB)

(73) Assignee: Secureworks Corp., Wilmington, DE (US)

( * ) Notice: Subject to any disclaimer, the term of this patent is extended or adjusted under 35 U.S.C. 154(b) by 183 days.

(21) Appl. No.: 16/006,167

(22) Filed: Jun. 12, 2018

(65) Prior Publication Data
US 2019/0377832 A1 Dec. 12, 2019

(51) Int. Cl.
*G06F 7/00* (2006.01)
*G06F 16/903* (2019.01)
(Continued)

(52) U.S. Cl.
CPC ........ *G06F 16/903* (2019.01); *G06F 21/6254* (2013.01); *H04L 63/1425* (2013.01); *H04L 63/20* (2013.01)

(58) Field of Classification Search
CPC .. G06F 16/903; G06F 21/6254; G06F 16/335; G06F 16/2455; G06F 16/2428;
(Continued)

(56) References Cited

U.S. PATENT DOCUMENTS

| 5,937,066 A | 8/1999 | Gennaro |
| 6,357,010 B1 | 3/2002 | Viets et al. |

(Continued)

FOREIGN PATENT DOCUMENTS

| WO | WO2007002749 A2 | 1/2007 |
| WO | WO2007090605 A1 | 8/2007 |
| WO | WO2010059843 A2 | 5/2010 |

OTHER PUBLICATIONS

Buyukkayhan, Ahmet Sali; Oprea, Alna; Li, Zhou; and Robertson, William; "*Lens on the endpoint; Hunting for malicious software through endpoint data analysis*"; International Symposium on Research in Attacks, Intrusions, and Defenses; RAID 2017; Research in Attacks, Intrusions, arid Defenses Proceedings; pp. 73-79; Sep. 18-20, 2017; Atlanta, GA, USA.
(Continued)

*Primary Examiner* — Azam M Cheema
(74) *Attorney, Agent, or Firm* — Womble Bond Dickinson (US) LLP

(57) ABSTRACT

A system can enable a global search of security data of a client base. The system can include a processor operable to record anonymity values set by clients of the client base, and to receive search requests including one or more search parameters from the clients. Upon receipt of a search request, processor can generate a result set for the received search request and determine an aggregated anonymity value for the result set. The processor further may compare the aggregated anonymity value of the results set with a set anonymity value for each of the clients for filtering or removing the data points or information of the one or more clients with the set anonymity value that is greater than the aggregate anonymity value from the result set.

18 Claims, 6 Drawing Sheets

(51) Int. Cl.
*H04L 29/06* (2006.01)
*G06F 21/62* (2013.01)

(58) Field of Classification Search
CPC .. G06F 16/24578; G06F 21/78; G06F 21/602; H04L 63/1425; H04L 63/20; H04L 63/08
See application file for complete search history.

(56) References Cited

U.S. PATENT DOCUMENTS

| | | |
|---|---|---|
| 7,269,578 B2 | 9/2007 | Sweeney |
| 7,331,061 B1 | 2/2008 | Ramsey et al. |
| 7,548,932 B2 | 6/2009 | Horvitz et al. |
| 7,555,482 B2 | 6/2009 | Korkus |
| 7,571,474 B2 | 8/2009 | Ross et al. |
| 7,594,270 B2 | 9/2009 | Church et al. |
| 7,606,801 B2 | 10/2009 | Faitelson et al. |
| 7,613,722 B2 | 11/2009 | Horvitz et al. |
| 7,770,031 B2 | 8/2010 | MacKay et al. |
| 7,856,411 B2 | 12/2010 | Darr |
| 8,079,081 B1 | 12/2011 | Laviik et al. |
| 8,122,495 B2 | 2/2012 | Ramsey et al. |
| 8,156,553 B1 | 4/2012 | Church et al. |
| 8,327,419 B1 | 12/2012 | Korablev |
| 8,407,335 B1 | 3/2013 | Church et al. |
| 8,490,193 B2 | 7/2013 | Sarraute et al. |
| 8,490,196 B2 | 7/2013 | Lucangeli et al. |
| 8,522,350 B2 | 8/2013 | Davenport et al. |
| 8,539,575 B2 | 9/2013 | Schmitlin et al. |
| 8,578,393 B1 | 11/2013 | Fisher |
| 8,595,170 B2 | 11/2013 | Gladstone et al. |
| 8,621,618 B1 | 12/2013 | Ramsey et al. |
| 8,701,176 B2 | 4/2014 | Ramsey et al. |
| 8,805,881 B2 | 8/2014 | Hom et al. |
| 8,832,048 B2 | 9/2014 | Lim |
| 8,839,414 B2 | 9/2014 | Mantle et al. |
| 8,909,673 B2 | 12/2014 | Faitelson et al. |
| 8,931,095 B2 | 1/2015 | Ramsey et al. |
| 8,938,802 B2 | 1/2015 | Davenport et al. |
| 8,959,115 B2 | 2/2015 | Marathe |
| 8,984,644 B2 | 3/2015 | Oliphant et al. |
| 9,009,828 B1 | 4/2015 | Ramsey et al. |
| 9,032,478 B2 | 5/2015 | Ballesteros et al. |
| 8,928,476 B2 | 6/2015 | Jerhotova et al. |
| 9,046,886 B2 | 6/2015 | Chong et al. |
| 9,047,336 B2 | 6/2015 | Hom et al. |
| 9,069,599 B2 | 6/2015 | Martinez et al. |
| 9,098,702 B2 | 8/2015 | Rubin et al. |
| 9,129,105 B2 | 9/2015 | Donley et al. |
| 9,137,262 B2 | 9/2015 | Qureshi |
| 9,298,895 B2 | 3/2016 | Lim |
| 9,319,426 B2 | 4/2016 | Webb et al. |
| 9,338,134 B2 | 5/2016 | Yin |
| 9,338,180 B2 | 5/2016 | Ramsey et al. |
| 9,430,534 B2 | 8/2016 | Bhattacharya et al. |
| 9,438,563 B2 | 9/2016 | Yin |
| 9,519,756 B2 | 12/2016 | Bitran et al. |
| 9,544,273 B2 | 1/2017 | Fleury |
| 9,548,994 B2 | 1/2017 | Pearcy et al. |
| 9,560,062 B2 | 1/2017 | Khatri et al. |
| 9,560,068 B2 | 1/2017 | Figlin et al. |
| 9,596,252 B2 | 3/2017 | Coates et al. |
| 9,628,511 B2 | 4/2017 | Ramsey et al. |
| 9,667,656 B2 | 5/2017 | Banerjee et al. |
| 9,667,661 B2 | 5/2017 | Sharma et al. |
| 9,710,672 B2 | 7/2017 | Braun |
| 9,742,559 B2 | 8/2017 | Christodorescu |
| 9,767,302 B2 | 9/2017 | Lim |
| 9,805,202 B2 | 10/2017 | Medeiros et al. |
| 9,973,524 B2 | 5/2018 | Boyer |
| 10,050,992 B2 | 8/2018 | Thymi |
| 10,116,500 B1 | 10/2018 | Long |
| 10,311,231 B1 | 6/2019 | Kayyoor |
| 10,382,489 B2 | 8/2019 | Das |
| 10,419,903 B2 | 9/2019 | Singh et al. |
| 10,425,223 B2 | 9/2019 | Roth |
| 10,474,820 B2 | 11/2019 | Manadhata |
| 10,491,632 B1 | 11/2019 | Natarajan |
| 2002/0129135 A1 | 9/2002 | Delany et al. |
| 2005/0138204 A1 | 6/2005 | Iyer et al. |
| 2005/0288939 A1 | 12/2005 | Peled et al. |
| 2006/0012815 A1 | 1/2006 | Ebner et al. |
| 2006/0037076 A1 | 2/2006 | Roy |
| 2006/0195575 A1 | 8/2006 | Delany et al. |
| 2006/0253447 A1 | 11/2006 | Judge |
| 2007/0226248 A1 | 9/2007 | Darr |
| 2007/0226807 A1 | 9/2007 | Ginter et al. |
| 2008/0077593 A1 | 3/2008 | Abrams et al. |
| 2008/0219334 A1 | 9/2008 | Brainos |
| 2008/0255997 A1 | 10/2008 | Bluhm et al. |
| 2008/0320000 A1 | 12/2008 | Gaddam |
| 2009/0198682 A1 | 8/2009 | Buehler et al. |
| 2010/0083374 A1 | 4/2010 | Schmitlin et al. |
| 2010/0125913 A1 | 5/2010 | Davenport et al. |
| 2011/0004771 A1 | 1/2011 | Matsushima |
| 2011/0179492 A1 | 7/2011 | Markopoulou et al. |
| 2011/0276604 A1 | 11/2011 | Hom et al. |
| 2012/0117640 A1 | 5/2012 | Ramsey et al. |
| 2012/0185275 A1 | 7/2012 | Loghmani |
| 2012/0246730 A1 | 9/2012 | Raad |
| 2012/0260341 A1 | 10/2012 | Chan et al. |
| 2013/0104191 A1 | 4/2013 | Peled et al. |
| 2013/0173620 A1 | 7/2013 | Takenouchi |
| 2013/0226938 A1 | 8/2013 | Risher et al. |
| 2013/0238319 A1* | 9/2013 | Minegishi ............... G06F 40/20 704/9 |
| 2013/0282746 A1 | 10/2013 | Balko |
| 2013/0291103 A1 | 10/2013 | Davenport et al. |
| 2013/0318604 A1 | 11/2013 | Coates et al. |
| 2014/0041028 A1 | 2/2014 | Ramsey et al. |
| 2014/0047544 A1 | 2/2014 | Jakobsson |
| 2014/0051432 A1 | 2/2014 | Gupta |
| 2014/0222712 A1 | 8/2014 | Samaha |
| 2014/0373151 A1 | 12/2014 | Webb et al. |
| 2015/0019323 A1* | 1/2015 | Goldberg ............ G06Q 30/0242 705/14.41 |
| 2015/0040225 A1 | 2/2015 | Coates et al. |
| 2015/0135287 A1 | 5/2015 | Medeiros et al. |
| 2015/0156212 A1 | 6/2015 | Khatri et al. |
| 2015/0186618 A1 | 7/2015 | Poorvin |
| 2015/0222652 A1 | 8/2015 | Ramsey et al. |
| 2015/0271047 A1 | 9/2015 | McLean |
| 2015/0324457 A1 | 11/2015 | McLean |
| 2016/0014140 A1 | 1/2016 | Akireddy |
| 2016/0014151 A1 | 1/2016 | Prakash |
| 2016/0078365 A1 | 3/2016 | Baumard |
| 2016/0099963 A1 | 4/2016 | Mahaffey |
| 2016/0139886 A1 | 5/2016 | Perdriau |
| 2016/0182546 A1 | 6/2016 | Coates et al. |
| 2016/0241591 A1 | 8/2016 | Ramsey et al. |
| 2016/0313709 A1 | 10/2016 | Biesdorf |
| 2016/0337400 A1 | 11/2016 | Gupta |
| 2016/0342805 A1 | 11/2016 | Lim |
| 2016/0378978 A1 | 12/2016 | Singla |
| 2017/0026343 A1* | 1/2017 | Wardman ................ H04L 63/06 |
| 2017/0098087 A1 | 4/2017 | Li |
| 2017/0111379 A1 | 4/2017 | Khatri et al. |
| 2017/0140295 A1 | 5/2017 | Bandara |
| 2017/0142149 A1 | 5/2017 | Coates et al. |
| 2017/0169154 A1 | 6/2017 | Lin et al. |
| 2017/0171228 A1 | 6/2017 | McLean |
| 2017/0201381 A1 | 7/2017 | Kinder et al. |
| 2017/0201431 A1 | 7/2017 | Kinder et al. |
| 2017/0201490 A1 | 7/2017 | Kinder et al. |
| 2017/0201548 A1 | 7/2017 | Kinder et al. |
| 2017/0243004 A1 | 8/2017 | Kinder et al. |
| 2017/0243005 A1 | 8/2017 | Kinder et al. |
| 2017/0244734 A1 | 8/2017 | Kinder et al. |
| 2017/0244750 A1 | 8/2017 | Kinder et al. |
| 2017/0244754 A1 | 8/2017 | Kinder et al. |
| 2017/0244762 A1 | 8/2017 | Kinder et al. |
| 2017/0318034 A1 | 11/2017 | Holland |
| 2018/0077189 A1 | 3/2018 | Doppke |
| 2018/0089574 A1 | 3/2018 | Goto |
| 2018/0091306 A1 | 3/2018 | Antonopoulos |

(56) References Cited

U.S. PATENT DOCUMENTS

| | | |
|---|---|---|
| 2018/0124073 A1 | 5/2018 | Scherman |
| 2018/0124085 A1 | 5/2018 | Frayman |
| 2018/0152480 A1 | 5/2018 | Kinder et al. |
| 2018/0181599 A1 | 6/2018 | Crabtree |
| 2018/0367550 A1 | 12/2018 | Musuvathi |
| 2019/0014149 A1 | 1/2019 | Cleveland et al. |
| 2019/0050554 A1 | 2/2019 | Fiske |
| 2019/0095801 A1 | 3/2019 | Saillet |
| 2019/0130009 A1 | 5/2019 | McLean |
| 2019/0132344 A1 | 5/2019 | Lem et al. |
| 2019/0141079 A1 | 5/2019 | Vidas et al. |
| 2019/0149564 A1 | 5/2019 | McLean |
| 2019/0342296 A1 | 11/2019 | Anandam |
| 2019/0379678 A1 | 12/2019 | McLean |

OTHER PUBLICATIONS

*Secureworks—Log Management—Protect your infrastructure from known and emerging threats*; www.secureworks.com/resources/ds-log-management; 2015 (available).

K-Anonymity; retrieved from https://en.wikipedia.org/wiki/K-anonymity; last edited Apr. 10, 2018.

Sofya Raskhodnikova & Adam Smith; CSE 598A Algorithmic Challenges in Data Privacy; Lecture 2; Jan. 19, 2010.

* cited by examiner

SYSTEMS AND METHODS FOR ENABLING A GLOBAL AGGREGATED SEARCH, WHILE ALLOWING CONFIGURABLE CLIENT ANONYMITY

BACKGROUND

In general, Managed Security Service Providers ("MSSPs") have a global visibility/access to the security data of all of their clients and can leverage this global visibility/access into such a large volume of security data to more quickly detect malicious attacks or security threats. This has been referred to as "network effect". However, the individual clients of MSSPs generally do not have the ability to access or utilize this visibility into other MSSP clients' data. For example, while an individual client generally can review its own security data and reports thereof for potential threats, malicious attacks, and/or detected potential threat indicators, MSSPs are not currently equipped to allow for secure access, querying and drill down searches of collected security data by such clients, while also adhering to privacy requirements or concerns that mandate strict controls on access and/or use of such data. In some instances, clients do not want to share any part of their security data, while other clients may be more open to sharing some limited parts of their data (e.g. participating in a threat intelligence community) as long as such data could be shared in a manner that substantially prevents client identification or other un-intended data leakage. Accordingly, a need exists for ways to enable global aggregated searches or queries of security data aggregated from differing clients, while also allowing for desired or selected restrictions to protect client anonymity. The present disclosure addresses these and other related and unrelated issues/problems in the art.

SUMMARY

Briefly described, the present disclosure is directed to systems and methods for enabling a global search of aggregated security data of a selected or global client base of an MSSP, in a sufficiently secure manner that allows clients/customers of the MSSP to take advantage of "network effect," e.g., to leverage increased access or sharing of security data gathered from across a broad client base to enable quicker identification and/or remediation of malicious attacks/security threats, while also providing configurable or selectable client anonymity for individual clients of the client base, to substantially prevent undesired client identification and/or other data leakage. While MSSP's act as a data broker within this example, there are possible embodiments where there are no $3^{rd}$ parties and distinct entities could share unfiltered, aggregated data by using a brokering service or distributed data store.

With the systems and methods of the present disclosure, clients or customers of a client group, can be provided or enabled with searchable access to one or more databases or data stores including specific security related data or information gathered from a larger group of clients of the client base, for example, security data compiled or aggregated by an MSSP serving the client base. Other suitable, authorized entities also may be permitted to have searchable access to such collected data stores, e.g., authorized third party technology partners or other data controllers or owners, security analysts, security researchers, security application developers, security incident responders, and/or various other suitable entities, without departing from the scope of the present disclosure.

The clients/customers who opt to participate and/or allow their security data to be included in the data stores each further will have the ability to set an anonymity tolerance or anonymity value, e.g., a k-anonymity value, representing a threshold level or amount of risk that such a client with access to the aggregated security data may be identified through the searches or querying of the data base/data stores.

For example, a method or process for enabling global searching of one or more data stores including aggregated security data of a plurality of clients in a client base can include receiving and recording a series of anonymity values set by participating clients of the client base whose security data is part of the one or more accessible data stores. In one aspect, participating clients generally may be allowed to select or set an infinite anonymity tolerance or value above an upper limit value, however, that would effectively remove such clients and/or their data from participation. Likewise, in another embodiment, participating clients generally may not be allowed to set their anonymity value to less than or equal to one, for example to prevent information linkage of a client's identity and/or enable aggregations that may leak information that breaches the anonymity parameters; unless that client organization agrees or particularly consents to participate with an understanding or knowledge of their potentially being identified during a search.

Search requests (e.g., from an initial or root search) including one or more specific search parameters can be received from or through authorized clients whose security data is part of the one or more searchable data stores. The search parameters may be directed or limited to include one or more indicators of compromise ("IOCs") or other suitable information, including but not limited to an IP address, an access time, an access date, an external email address, a country of origin, a traffic type, a communication type, and/or combinations thereof. In addition, while various indicators can be selected for a set or subset of clients/organizations, such indicators generally should not be identifiers for any participating organizations at any established or client selected k-value.

Search requests further may include compound searches or "drill down" searches that allow for parsing and branching of the searched data for narrowing the search results, while searching of specific client identifiable information or the joining of data sets (such as searches on known client IP ranges, domain names, IP data sets, etc.) may be prohibited. In some embodiments, it also may be possible to dynamically create quasi-identifiers to allow for more participation, for example, a generalization in allowing the domain part of an email address to be searched; i.e. 'gmail.com' from ps@gmail.com.

Upon receipt of a participant search request, a result set or cluster of data will be generated together with an aggregated anonymity score for the result set or cluster of data.

If the result set or data cluster includes data points and/or other information from clients whose set anonymity value is greater than the aggregated anonymity value determined for the result set or data cluster, the data and/or other information of such clients will be removed or otherwise filtered out from the result set to generate one or more filtered result sets or data clusters. A new aggregated anonymity score further can be determined for the filtered result sets or data clusters.

When it is determined that the initial or filtered result set or data cluster does not include data or other information from clients with a selected anonymity value greater than the aggregated anonymity score, the result set or data cluster can be displayed or otherwise presented to the client or clients performing the search query or request.

This method/process further can be repeated each time a client(s) modifies or updates the search (e.g., modifies, filters or adds new search terms, etc.) to further process the search result while continuing to substantially protect client anonymity and/or otherwise prevent unintended data leakage.

The method/process also can include scaling of anonymity values, such as to prevent client identification or other unintended data leakage. In one example, an enumerated scale can be determined or selected for the set/selected anonymity values, with one or more bounds/limits selected. Clients with prescribed anonymity values above or below these bounds/limits can be grouped together to generally correspond to the set/selected bounds.

In another aspect, the present disclosure is directed to a system or platform that enables clients of an MSSP, or other data controllers or owners, security analysts, security researchers, security application developers, security incident responders, and/or other authorized entities to perform global aggregated searching of security data aggregated, for example, across a particular client base, such as a client base of an MSSP and/or a threat community, while substantially protecting the anonymity of the individual clients or owners of the data of the aggregated security data store. This system can include memory systems or storage devices configured to receive and store one or more searchable data stores including security data gathered from a plurality of clients of the client base and/or threat community. Such memory or storage can include servers or other suitable information handling system(s) in an MSSP's event/data center, though other memories or storage systems, e.g., cloud based storage, is possible without departing from the scope of the present disclosure. The security data can include security logs, event logs, raw data, etc. gathered from monitoring of, or otherwise received from, one or more networked systems of the plurality of clients.

The system will include one or more processors, i.e., a processor of a server, computer, or other suitable information handling system, which can be resident at an MSSP event/data center or part of a client's networked system, which processor(s) includes programming for and/or is operable to authorize/verify access to and facilitate global searching of the security data stores, while also maintaining substantial client anonymity or otherwise preventing data leakage, e.g., by allowing clients to set or select an anonymity tolerance or anonymity value.

The processor(s) further will be operable to record a series of anonymity k-values set or selected by each of one or more clients of the plurality of participating clients who have security data that is part of the one or more searchable data stores. Upon receiving search requests including one or more search parameters, e.g., IOCs or other security parameter information, from one or more clients, the processor(s) will perform the requested search(es) and generate result sets or data clusters based on the one or more search parameters.

Further, the processor(s) can determine an aggregated anonymity score for the generated result set based upon the recorded anonymity values of the clients whose data is being searched and/or included in the result set. If the generated result set includes data points or information from one or more clients having an anonymity value greater than the aggregated anonymity score, the processor(s) is operable to filter or remove the data points or information of the one or more clients with the set anonymity value greater than the aggregate anonymity value from the generated result set.

Still further, upon a determination that the result set does not include data points or information from one or more clients with a set anonymity value that is greater than the aggregated anonymity score, the processor can present the result set, e.g., to the one or more requesting clients and perform additional searches and/or filtering of the result set as needed, and subject to updated/revised anonymity scores generated for such further searches.

Various objects, features and advantages of the present disclosure will become apparent to those skilled in the art upon a review of the following detail description, when taken in conjunction with the accompanying drawings.

BRIEF DESCRIPTION OF THE FIGURES

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION

The following description in combination with the Figures is provided to assist in understanding the teachings disclosed herein. While the description discloses various implementations and embodiments of the teachings, and is provided to assist in describing the teachings, the implementation, features and embodiments discussed herein should not be interpreted as a limitation on the scope or applicability of the teachings.

Figure 1:
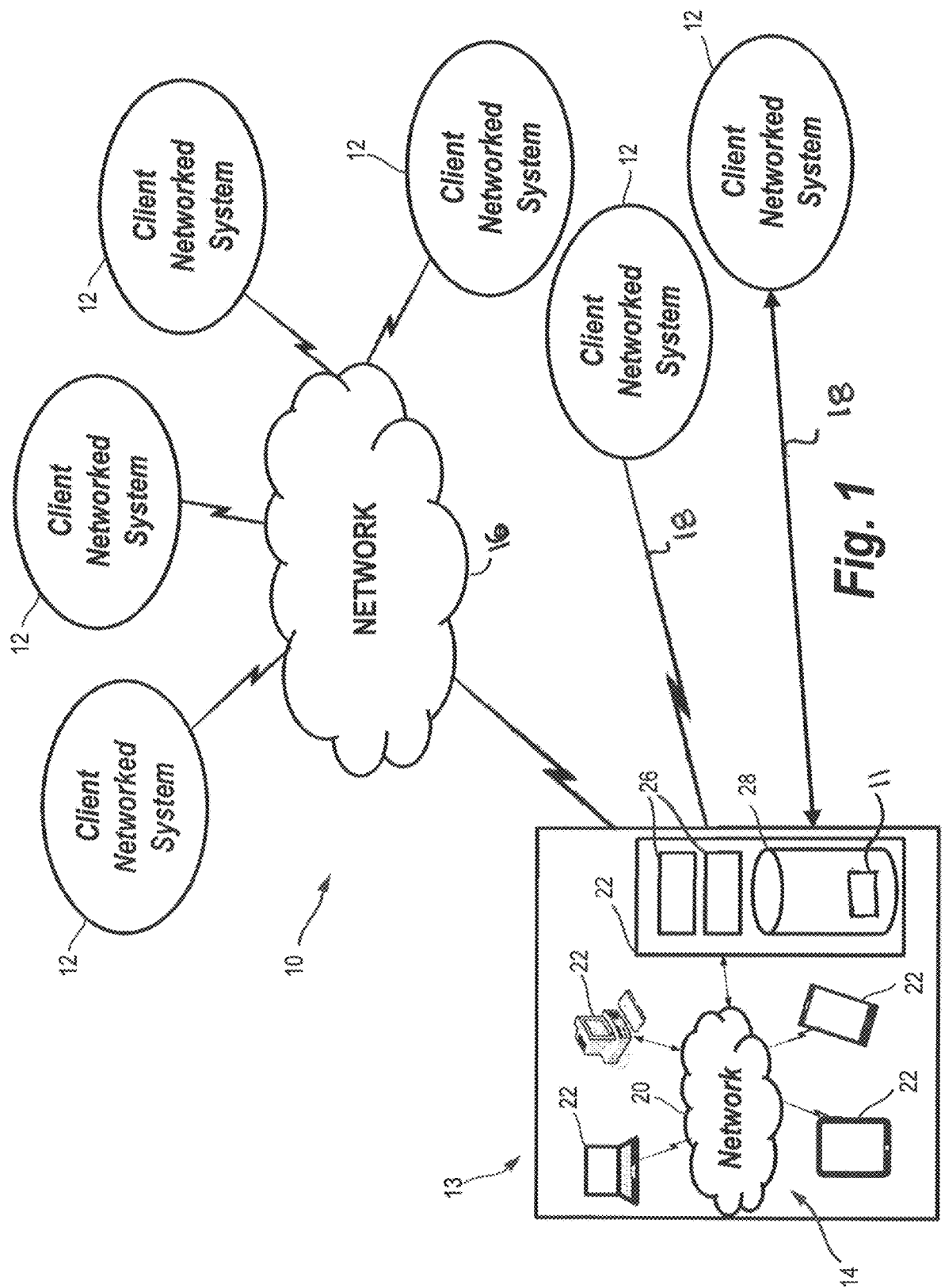
FIG. 1 is a schematic diagram of a system for security information and event management according to one aspect of the present disclosure.

FIG. 1 shows a block diagram of a security and event management system 10 that is operable to allow for global searching of security-related data obtained and aggregated from security monitoring of differing customer/client networks and platforms, such as networked systems 12 managed by customers/clients of a client base. The client base can include broad, diverse clients/customers of different sizes, from different industries, etc., and security or event management for the clients in the client based may be managed by an MSSP as discussed below. In addition, the client base also can include participants or members of threat communities or other data sharing groups.

With the system 10 of the present disclosure, clients or customers of the client base can be enabled to have searchable access to a global or expanded data base including one or more data stores 11 of security-related data obtained/ aggregated from across the client base (e.g., by an MSSP)

and/or as shared by the threat community members. However, other specifically authorized entities, such as third party technology providers, other data controllers or owners, security analysts, researchers, security application developers, security incident responders, and/or other suitable entities, also may be authorized to have searchable access to the data stores(s) 11, without departing from the scope of the present disclosure. As a result, clients/customers and/or other participating entities are enabled to take advantage of a "network effect" from the collection and aggregation of security data from a large volume of related and unrelated sources, which allows leveraging of such an expanded collection of information to more quickly and efficiently predict, detect, respond, remediate and/or prevent malicious attacks and/or security threats that potentially may not be recognized or otherwise indicated from just a single client's particular security data.

The clients/customers whose security data or other information is part of the one or more data stores 11 also will have the ability to set or select an anonymity tolerance agglomerated for use as representative of the amount or tolerance of risk that a particular client may be identified through the searches or querying of the data stores 11. For example, each client/customer that elects or opts into participation and allows use of their collected security data in the data store 11, will set an anonymity value associated with their level of risk tolerance and corresponding use of their security data. As such, the clients/customers of the client can allow for use of their security data to bolster "network effect," while also reducing the risk that such clients/customers will be identified or will otherwise be prone to data leakage.

As also shown in FIG. 1, the client/customer systems 12 can be in networked/linked communication with a security event management center 13, or other security collection and processing center, including one or more data management centers 14, e.g., as managed by an MSSP. The client/customer networked systems 12 can communicate with the data center 14 through a network 16, such as a public or private network, e.g., a local area network, though client/customer information handling systems 12 also can be in communication with the data center 14 through other suitable lines of communication 18, such as peer to peer file sharing systems, and/or other, suitable wireless, virtual, and/or wired connections. The data center 14 further can include one or more internal networks 20 with a plurality of information handling systems 22, connected thereto. In one embodiment, the information handling systems 22 can comprise several computer(s) and can include a processor 26, and a memory or other suitable storage medium 28. The memory 28 can include a random access memory (RAM), read only memory (ROM), and/or other non-transitory computer readable mediums.

Figure 2:
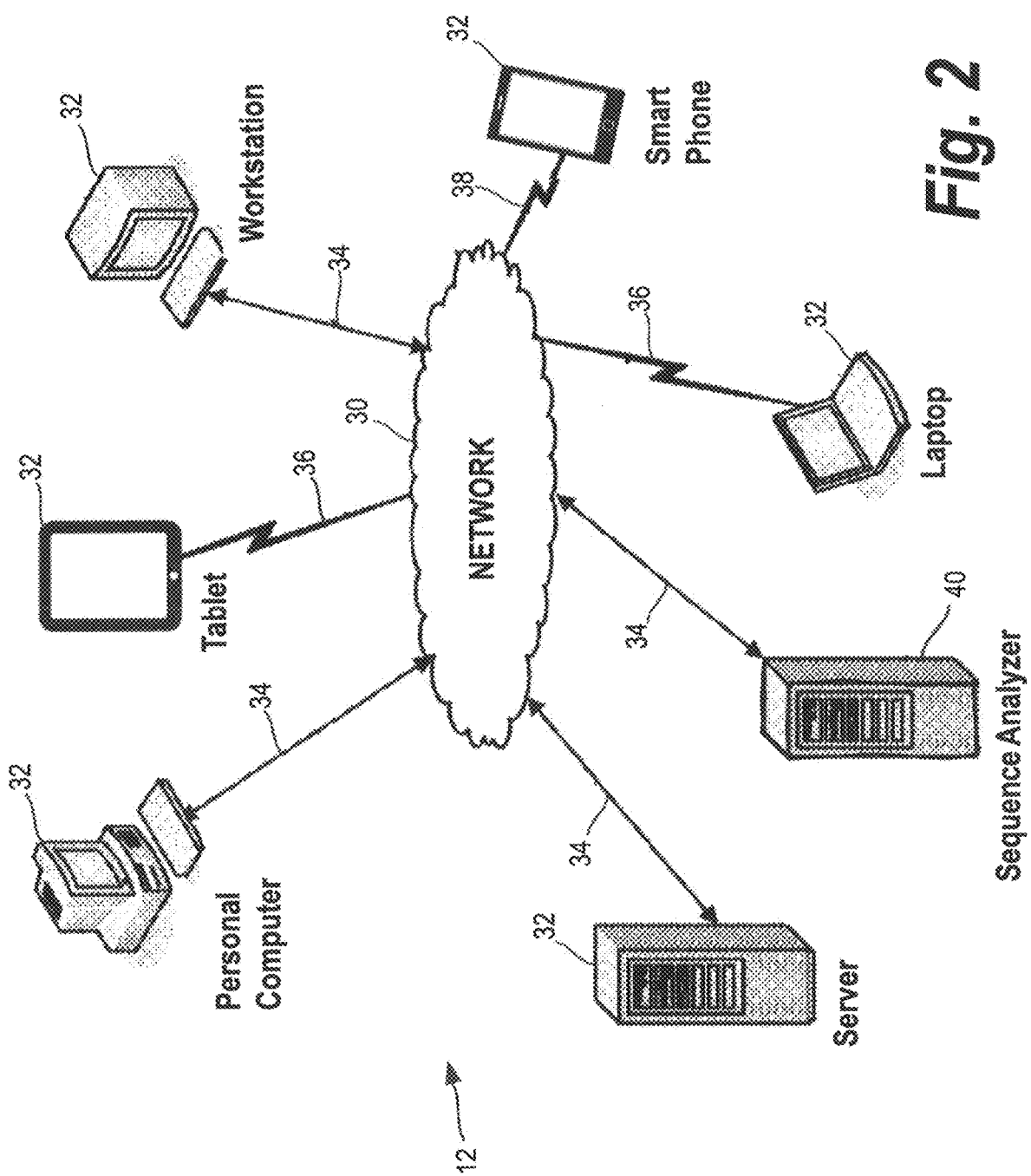
FIG. 2 is a schematic diagram of a client/customer networked system of information handling systems according to one aspect of the present disclosure.

FIG. 2 shows a block diagram of exemplary client/customer networked systems 12. The client/customer systems 12 can include a network 30, which may include the internet or another wide area network, a local area network, or a combination thereof. The network 30 may provide data communications among a series of information handling systems 32, which can include workstations, personal computers, smart cellular telephones, personal digital assistants, laptop computers, servers, and other suitable devices. The information handling systems 32 can be coupled to the network 30 through wireline connections 34, wireless connections 36, such as Wi-Fi or cellular connections, or other suitable lines of communication, or combinations thereof. In some aspects, the information handling systems 32 of the networked systems 12 generally can be configured for a specific user or a specific use, such as financial transaction processing, airline reservations, enterprise data storage, online shopping, global communications, etc.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system also may include one or more buses operable to transmit communications between the various hardware components.

As further shown in FIG. 2, the client/customer networked systems 12 further may include one or more monitoring devices 40 communicatively coupled to the network 30, for example, through a wired connection 34, though or other suitable connections, such as a wireless connection, also can be used. The monitoring devices 40 may include a server or sequence analyzer or other suitable computing device that has a processor and a memory or other suitable storage. The memory can include a random access memory (RAM), read only memory (ROM), and/or other non-transitory computer readable medium. The monitoring devices 40 further typically will be operable to store and execute computer readable instructions to continuously monitor, in real-time, activity at each networked system 12, for example, security activity of the information handling systems 32 connected to network 30 such as the logging on and off of the network 30 by each of the information handling systems 32, downloads or uploads, changes to settings, IP addresses accessed by or which have attempted to access the network, irregularities in work traffic, etc. Additionally, activities from executed processes (i.e., type, number of times accessed, resulting actions, etc.), types and/or numbers of files modified, network data flow aggregates, and other, similar activities also can be monitored and collected as part of security log data/records. Other known processes and/or methodologies for facilitating self-setting k-values also can be used.

The monitoring device(s) 40 communicatively coupled to the client/customer systems 12 additionally can be configured and will include programming designed to aggregate, ingest, or otherwise receive, identify, and parse incoming security data, such as parsing a plurality of security or event logs or other suitable records of the plurality of devices 32 and/or the client's networked system 12. The security data can be stored in a memory or storage of the monitoring devices 40 and can be communicated to and/or accessed by the MSSP providing security services for the clients. For example, each monitoring device 40 can automatically send the security data to the one or more servers at an MSSP data center, or the MSSP can otherwise directly access the security data from the memory or storage of the monitoring device(s) and store the security data in the one or more data stores 11 with a memory on a server or other suitable information handling systems 22 at the security event management center 13, such that the security data is accessible to be searched by authorized clients/customers via the network. It should be recognized, however, that the security data can be otherwise securely stored in any other suitable storage or memory. It further will be recognized that the implementation of monitoring devices 40 at or in direct communication with the client/customer networked systems 12 is optional, and participating clients/customers or technology partners further can independently provide security data to an MSSP or other entity/collector, such as through one or more of the information handling systems 32, for storage in and/or population of the one or more data stores 11.

Participating clients/customers, or other authorized entities, generally can have searchable access to the aggregated security related data stored/received in the one or more data stores 11 (e.g., having a defined or limited level of access to the raw security data from an entire group or subject of MSSP clients). However, each of the clients/customers whose security related data is included in such data stores 11 further will have the ability to set an anonymity tolerance or risk threshold, such as by selecting or setting an anonymity value, e.g., a k-anonymity value, representative of the amount of risk that the particular clients may be identified through the searches or querying of the data base/data stores. Thereafter, if a returned results set or data cluster has determined risk score, of identifying a particular client, or otherwise leaking a client's data, that is greater than the anonymity tolerance or risk threshold value set by that client, the client's data points or information generally will be removed or filtered out of the returned results set.

In one embodiment, clients or other authorized entities can access a computer program product, application, etc., e.g., using one of the client managed information handling systems 32, and initiate searching or querying of the security data in the data stores 11, for example, to facilitate the detection/identification of potential malicious actors or security threats, and possibly remediate or take preventative actions thereagainst, to develop applications or programs for threat prevention/identification, etc. The computer program product or application also may provide a user interface or one or more displays through which one or more inputs can be submitted by the requesting entity to allow for root or compound (or "drill down") searching of the security data. A root search can include an initial search with specific search parameters, and a compound or "drill down" search can include a search of the results of a root search based on further search parameters, compound searches or "drill down" searches will allow for branching or subsetting of the data. In one example, search parameters may be required to be anchored around indicators of compromise ("IOC") or other similar information, including but not limited to an IP address, an access time, an access date, an email address, such as an email that is external to the participating clients, a country of origin, a traffic type, a communication type, and/or combinations thereof. Further, with embodiments of the present disclosure, clients/customers may be prohibited from searching specific information that will or is likely to reveal a client's identity or other information, for example, such as searches on known client IP ranges or domain and IP data sets, and searchers further may be prohibited from joining data sets.

The user interface or displays of the application/program also may allow or provide a mechanism through which clients/customers will set or select their desired anonymity tolerance, or can be queried, or otherwise provided with information, feedback and/or assistance in setting their personal anonymity tolerance. For example, to select an anonymity value, e.g., a k-anonymity value, the client/customer can select a value from within a predefined range, such as 1 to 25, 1 to 100, 1 to 10,000, 5 to 25, 10 to 500, etc., or other suitable integer numbers. The predefined range further can correspond to a total number of clients of the client base whose security related information is included in the one or more data stores. For example, if 100 clients have security related data included in the one or more data stores 11, the predefined range can be 1 to 100, or some subset thereof such as 10 to 90, 20 to 80, etc., and clients can select an integer value within said range. In some embodiments, the clients/customers generally may not be allowed to select an infinite anonymity value (e.g., to prevent their data from being included while still having access to the searchable data store(s)), or to set their anonymity value to less than or equal to one (which potentially allow identification and/or broad leakage of client information). The interface also can provide a visual guide or other representation or examples of varying anonymity levels to help clients/customers in the selection of their anonymity values.

Figure 3:
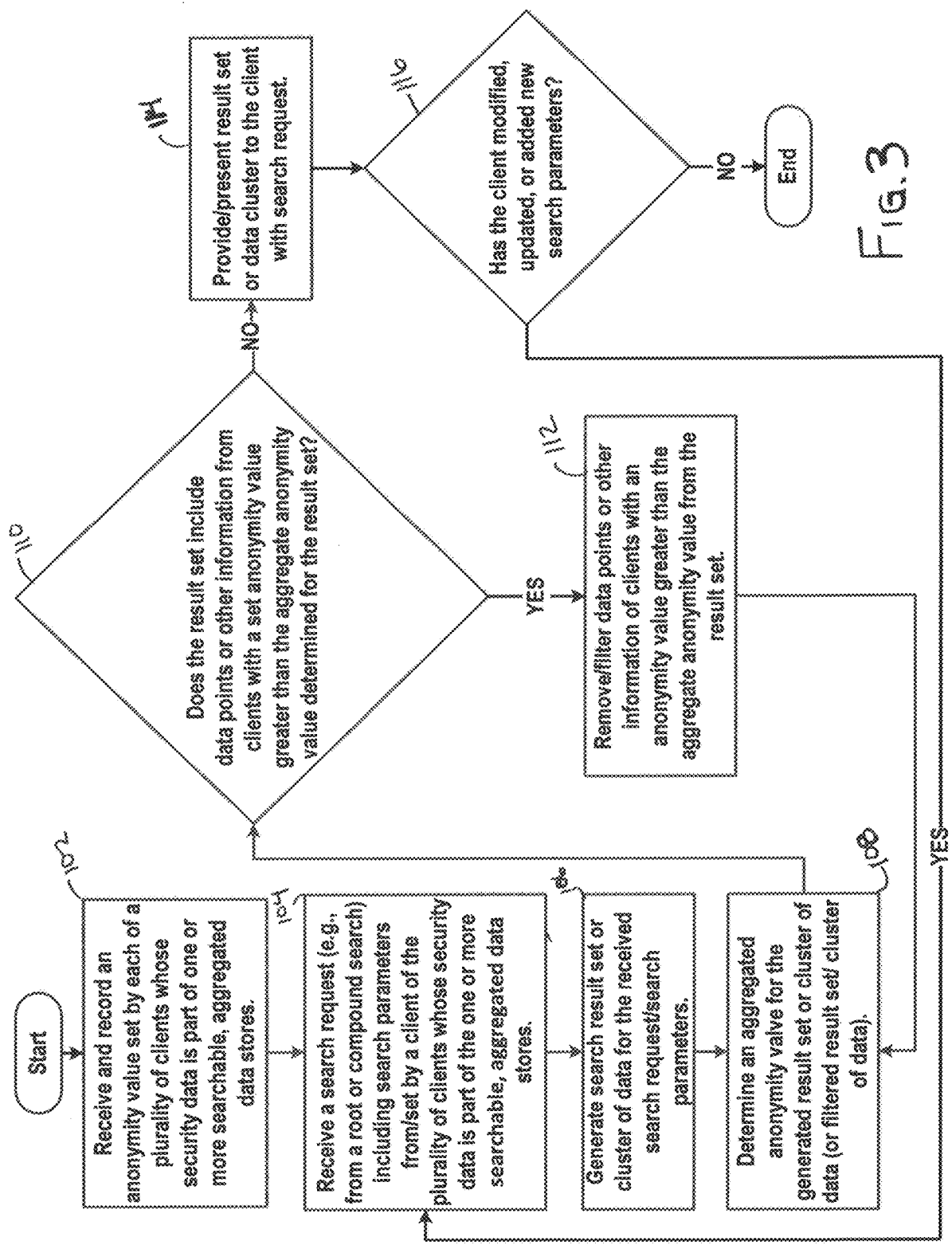
FIG. 3 shows an example flow chart for a method of allowing a global search, with selectable client anonymity according to principles of the present disclosure.

FIG. 3 shows a flow diagram of a method/process for allowing a global search of the one or more data stores 11, while allowing for a selectable anonymity threshold for clients with security related data in the one or more data stores 11. As shown in FIG. 3, at 102, anonymity values set by clients/customers whose security data is part of the one or more searchable, aggregated data stores 11 can be received and recorded.

Thereafter, at 104, a search request (e.g., from a root or compound or "drill down" search) can be received from an authorized client/customer or other participating entity. The search request can include one or more search parameters from or set by one or more clients whose security data is part of the one or more searchable, aggregated data stores or other suitable, authorized entities.

Upon receipt of the search request, a result set or cluster of data for the received search requests or search parameters will be generated at 106.

At 108, an aggregated anonymity value/score for the generated result set or cluster of data will be determined. In one example, the aggregated anonymity value can include or relate to the total number of clients/customers whose data will be returned in the result set or data cluster.

At 110, it then can be determined whether the result set or cluster of data includes data points and/or other information from clients with an anonymity value greater than the aggregated anonymity value determined for the result set or data cluster. If so, as indicated at 112, the data points and/or other information of such clients having an identified/associated anonymity value greater than the aggregate anonymity score derived from the result set or cluster of data can be filtered out or otherwise removed. The process/method further can return to step 108, wherein a further aggregated and/or adjusted anonymity score can be determined for the filtered result set or cluster of data.

This series of steps can be further repeated/re-run until no data remains, or it is determined that the adjusted result set or cluster of data (or the filtered result set or cluster of data) does not include data points or other information from clients with a set anonymity value greater than the determined aggregated anonymity score. Thereafter, such a result set or data cluster will be presented to the client or other authorized entity performing the search query (at 114).

Additionally, client selected anonymity values further can be scaled or otherwise modified, e.g., to further help guard against and/or prevent client identification or other data leakage through conduct of repeated searches to try to identify a participant has a k-value and where the client is participating or not. In one example, an enumerated scale can be set for the set/selected anonymity values, such that one or more bounds can be set or selected and anonymity values above or below the set selected bounds are modified to correspond to the bounds. In one embodiment, specific bounds, e.g., 10, 25, 75, or any other suitable numbers, can be set/selected, such as by the MSSP, and the set/selected client anonymity values that are sufficiently close to or sufficiently similar, e.g., within a specific range, standard deviation, etc., to the bounds can be scaled to those selected/specific bounds when determining if the aggregated anonymity value exceeds the client set/selected values at 110.

Actions 104 to 114 as shown in FIG. 3 also can be repeated each time the client(s) or other authorized entity modifies or updates the search (e.g., modify search terms, add new search terms, preform a compound search, etc.) as determined at 116.

It further will be understood that any of actions 102 to 116 can be performed by the processor(s) 26 of the information handling system(s) 22 at the security event management center 13 and/or on one or more processors of the information handling systems 32 that are a part of the client networked systems 12, though any other suitable processor or computing device can be used without departing from the scope of the present disclosure. It further will be understood that any of the actions 102 to 116 can be rearranged and/or other steps can be added without departing from the scope of the present disclosure.

Figure 4:
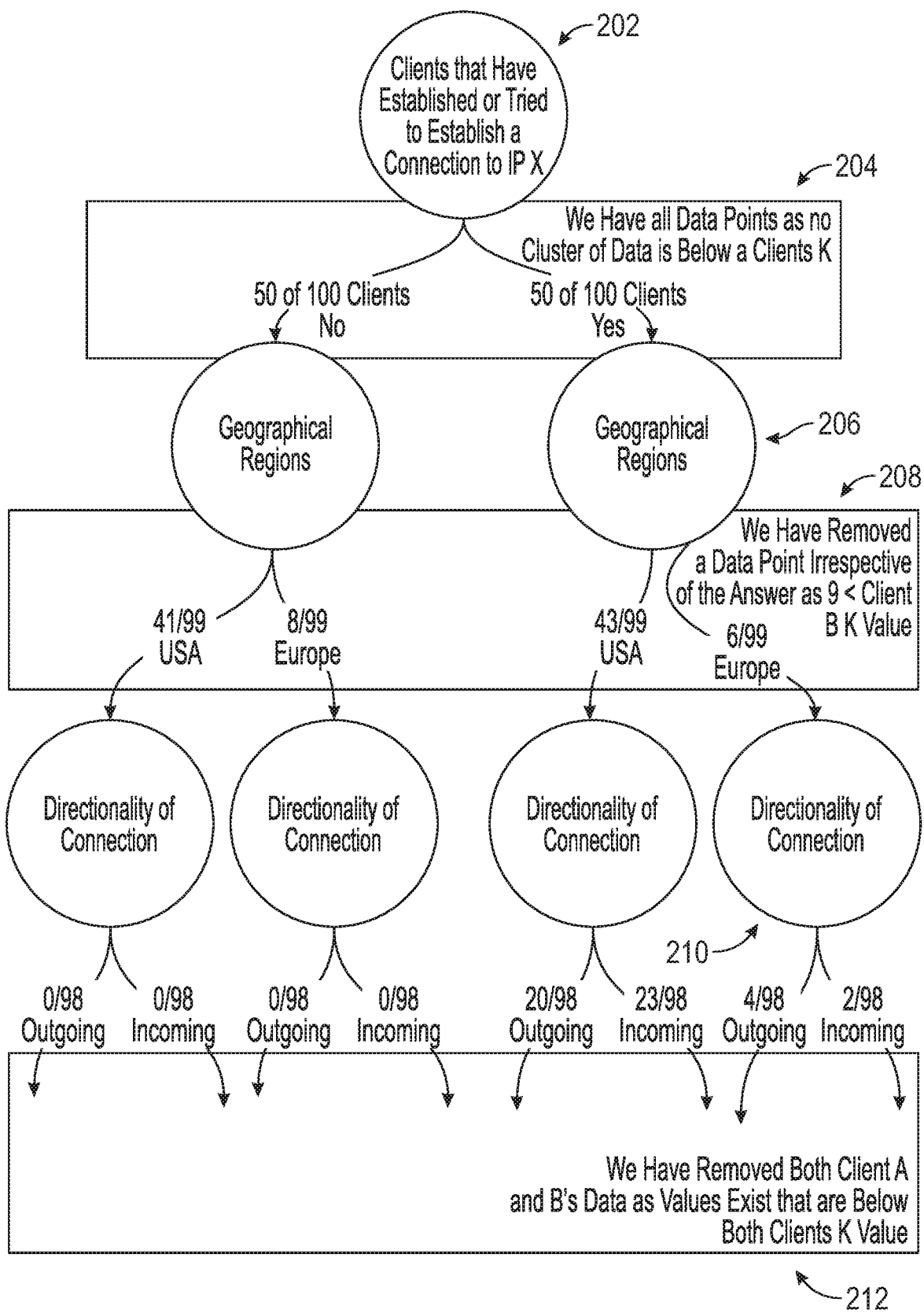
FIG. 4 shows an example flow diagram for exemplary root and compound searches according to one aspect of the present disclosure.

FIG. 4 shows an example of a development of a security data search query to produce a result set according to one aspect of the present disclosure. For the example shown in FIG. 4, the data store contains security data for 100 total clients, and a first client, e.g., client A, has set their anonymity value to 5, while at least a second client, e.g., client B, has set their anonymity value to 10. All other clients have set their anonymity values to 1. As an initial step, a root search request/inquiry is received, including selected search parameters, e.g., as shown in FIG. 4, the search is requesting clients in the data store that have established or tried to establish a connection with a specific IP address, e.g., IP X (at 202). This query generates 2 result sets, "yes" or "no," and, as the result sets for both answers, each have an aggregated score of 50 (which is greater than the participating client's selected anonymity values 1, 5, and 10), no client data points will be removed or filtered from the result set or cluster of data for this inquiry/search (at 204).

Thereafter, a compound or "drill down" search request may be received containing further search parameters, e.g., a request to determine a geographical region or regions from which the specific IP address is indicated, as coming from or being associated with (e.g., USA or Europe at 206). As shown at 208, one of the result sets returned data points for only 6 clients, which aggregate score is less than client B's selected anonymity value of 10. As a consequence, client B's particular data points and/or information will be removed from at least one and generally all of the subsequent result sets. Client B's data points/information also will be removed from inclusion in any further compound or filtered searches.

As shown in FIG. 4, a still further compound or "drill down" search, including additional search parameters, e.g., to determine the directionality of the connection, either outgoing or incoming, can be received at 210. As shown at 212, because one of the results sets for this compound search will include data points or information from only two clients, generating an aggregate score of 2, client A's data will be removed since this aggregate anonymity value of 2 is less that client A's set anonymity value of 5.

Figure 5:
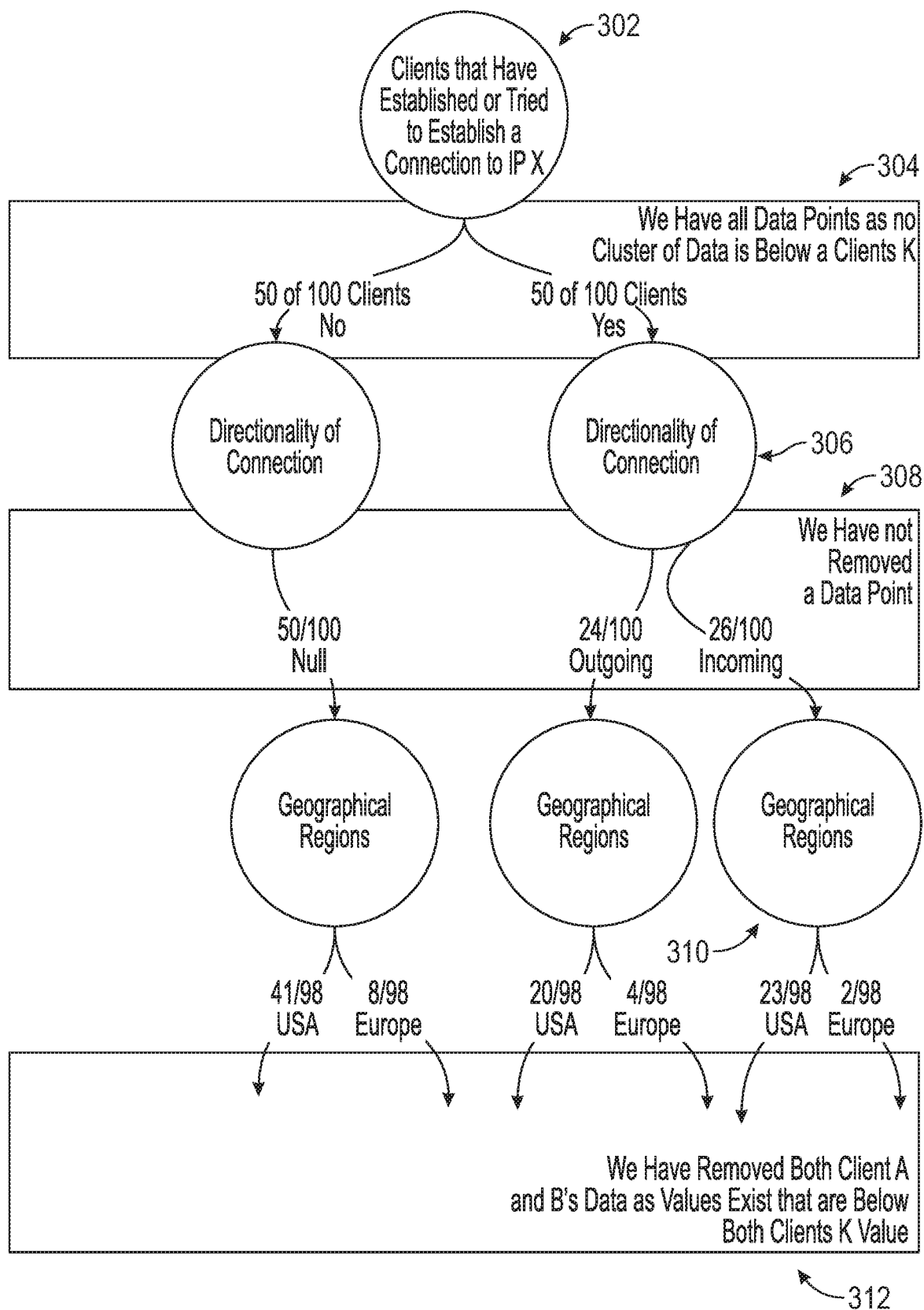
FIG. 5 shows an example flow diagram for exemplary root and compound searches according to another aspect of the present disclosure.

FIG. 5 shows another example of a leveraged client security data search according to another aspect of the present disclosure. As with FIG. 4, for FIG. 5, in this example, the total client base is 100, client A has set their anonymity value to 5, client B has set their anonymity value to 10, and all other clients have set their anonymity value to 1.

As shown in FIG. 5, at 302, the client search request is received and includes search parameters, here asking whether the clients in the client base have established or tried to establish a connection to a specific IP, e.g., IP X. As shown at 304, this resulted in 50 yes and 50 no results; and since the result sets do not have aggregated anonymity score/value below any of the clients' anonymity values, all 100 participating clients' data points or information will be returned in the search results.

Thereafter, at 306, a compound, filtering or "drill down" search request containing parameters on the directionality of connection, e.g., outgoing or incoming, was received. However, in this example, since the aggregate score of the resultant data points was not below either of client A's or client B's selected anonymity values, or any of the other client anonymity values, all client security data points will remain, i.e., no data points will be removed, as shown at 308.

An additional compound or "drill down search" further can be received, for example, to narrow, revise, or filter the overall results to specific geographical regions, e.g., U.S.A. or Europe, tied to the IP address (and/or use thereof) at 310; and, as shown in FIG. 5, since the results from the search include an aggregate anonymity score that is less than the set anonymity values of both client A and client B, e.g., a score of "4" outgoing connections to/from address "IPX" was found, which is less than B's anonymity value of "10" and A's anonymity value of "5," the security data or information from both client A and client B will be removed from the result set (at 312).

Figure 6:
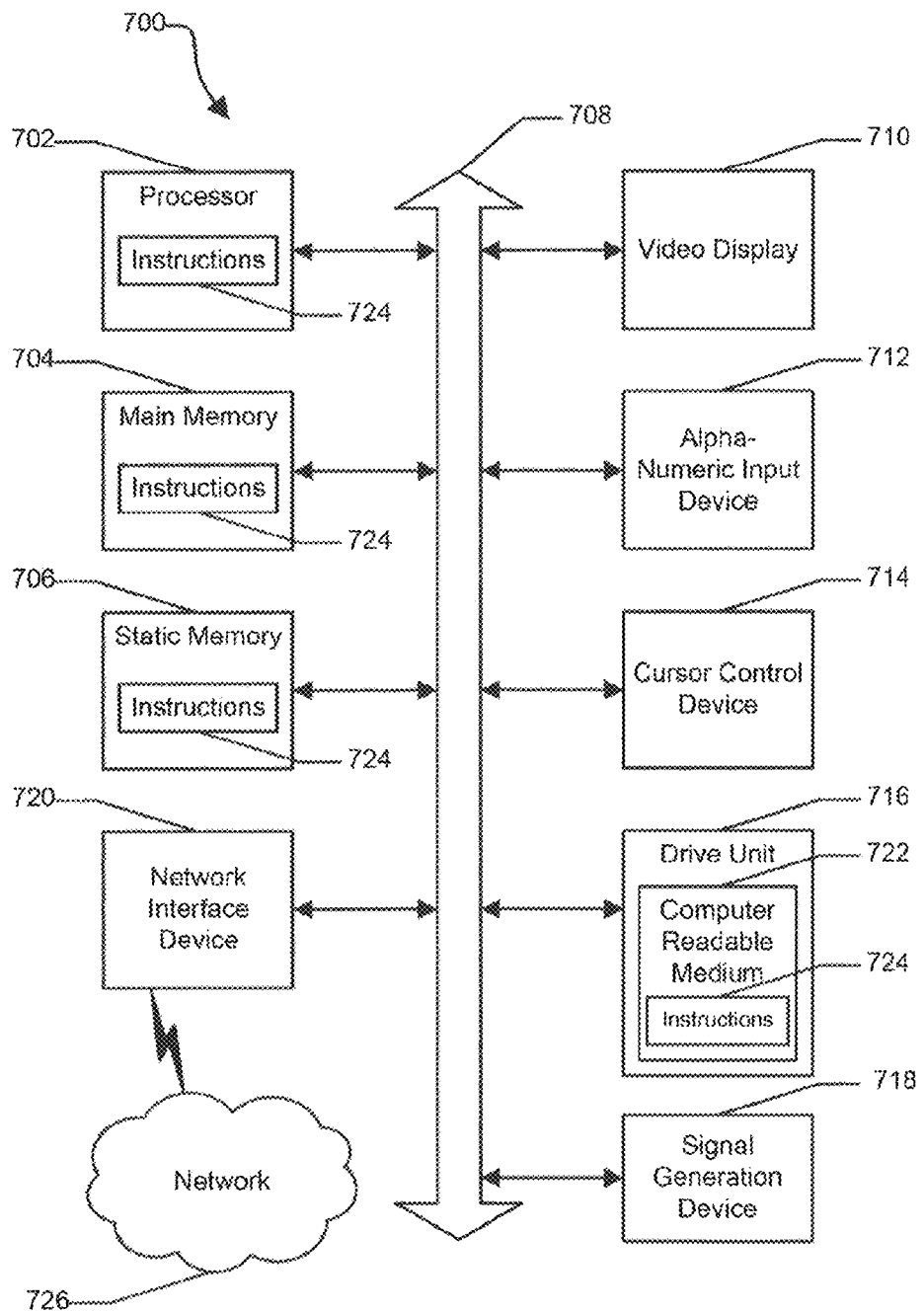
FIG. 6 shows an exemplary information handling system according to one aspect of the present disclosure.

FIG. 6 shows an example of an information handling system 700 capable of administering each of the specific embodiments of the present disclosure. The information handling system 700 can represent the client and MSSP information handling systems 22, 32, and 40 of FIGS. 1 and 2, and/or other information handling systems included in or otherwise in communication with the data center 13 and/or the networked systems 12. The information handling system 700 may include a computer system or processor 702 such as a central processing unit (CPU), a graphics processing unit (GPU), or both. Moreover, the information handling system 700 can include a main memory 704 and a static memory 706 that can communicate with each other via a bus 708. The information handling system 700 includes near-field communications (NFC) device and interface 718, such as an antenna and NFC subsystem. The information handling system 700 can also include a disk drive unit 716, and a network interface device 720.

As shown, the information handling system 700 further may include a video display unit 710, such as a liquid crystal display (LCD), an organic light emitting diode (OLED), a flat panel display, a solid state display, or a cathode ray tube (CRT), or other suitable display. The video display unit 710 may also act as an input accepting touchscreen inputs. Additionally, the information handling system 700 may include an input device 712, such as a keyboard, or a cursor control device, such as a mouse or touch pad, or a selectable interface on the display unit. Information handling system may include a battery system 714. The information handling system 700 can represent a device capable of telecommunications and whose can be share resources, voice communications, and data communications among multiple devices. The information handling system 700 can also represent a server device whose resources can be shared by multiple client devices, or it can represent an individual client device, such as a laptop or tablet personal computer, and/or any other suitable device without departing from the scope of the present disclosure.

The information handling system 700 can include a set of instructions that can be executed to cause the processor to perform any one or more of the methods or computer based functions disclosed herein. The processor 702 may operate as a standalone device or may be connected such as using a network, to other computer systems or peripheral devices.

In a networked deployment, the information handling system 700 may operate in the capacity of a server or as a client information handling device in a server-client user network environment, or as a peer computer system in a peer-to-peer (or distributed) network environment. The information handling system 700 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single information handling system 700 is illustrated, the term "system" shall also be taken to include any collection of systems or subsystems that individually or jointly execute a set, or multiple sets, of instructions to perform one or more computer functions.

The disk drive unit 716 or static memory 714 may include a computer-readable medium 722 in which one or more sets of instructions 724 such as software can be embedded. The disk drive unit 716 or static memory 714 also contains space for data storage. Further, the instructions 724 may embody one or more of the methods or logic as described herein. In a particular embodiment, the instructions 724 may reside completely, or at least partially, within the main memory 704, the static memory 706, and/or within the processor 702 during execution by the information handling system 700. The main memory 704 and the processor 702 also may include computer-readable media. The network interface device 720 can provide connectivity to a network 726, e.g., a wide area network (WAN), a local area network (LAN), wireless network, or other network. The network interface device 720 may also interface with macrocellular networks including wireless telecommunications networks such as those characterized as 2G, 3G, 4G, 5G, LTE or similar wireless telecommunications networks similar to those described above. The network interface 720 may be a wireless adapter having antenna systems for various wireless connectivity and radio frequency subsystems for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal; so that a device connected to a network 726 can communicate voice, video, or data or other information data over the network 726. Further, the instructions 724 may be transmitted or received over the network 726 via the network interface device 720. In a particular embodiment, BIOS/FW code 724 reside in memory 704, and include machine-executable code that is executed by processor 702 to perform various functions of information handling system 700.

Information handling system 700 includes one or more application programs 724, and Basic Input/Output System and Firmware (BIOS/FW) code 724. BIOS/FW code 724 functions to initialize information handling system 700 on power up, to launch an operating system, and to manage input and output interactions between the operating system and the other elements of information handling system 700.

In another embodiment (not illustrated), application programs and BIOS/FW code reside in another storage medium of information handling system 700. For example, application programs and BIOS/FW code can reside in drive 716, in a ROM (not illustrated) associated with information handling system 700, in an option-ROM (not illustrated) associated with various devices of information handling system 700, in storage system 706, in a storage system (not illustrated) associated with network channel 720, in another storage medium of the information handling system 700, or a combination thereof. Application programs 724 and BIOS/FW code 724 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile, read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present invention as set forth in the appended claims.

What is claimed is:

1. A method leveraged for global searching of one or more searchable data stores including aggregated security data of a plurality of anonymous clients in a client base, comprising:

recording anonymity values for each client of the plurality of anonymous clients of the client base who have security data aggregated and included in the one or more searchable data stores, wherein the anonymity values are representative of a tolerance or amount of risk that a client with security data on the one or more searchable data stores may be identified through searches or querying of the one or more searchable data stores;

receiving a search request from at least one client of the plurality of anonymous clients, wherein the search request comprises one or more search parameters for searching or querying of the security data in the one or more searchable data stores to facilitate identification of malicious actors or security threats, remediation or preventative action against the malicious actors or security threats, development of applications or programs for threat prevention or identification of the malicious actors or security threats, or combinations thereof;

generating one or more result sets responsive to the received search request;

determining an aggregated anonymity score for each of the one or more generated result sets; and comparing the aggregated anonymity score for each of the one or more generated result sets with the anonymity value for each client of the plurality of anonymous clients of the client base; and if the anonymity value of any of the clients is greater than the aggregated anonymity score, removing the security data of each client whose anonymity value from the generated result set is greater than the aggregate anonymity score of the generated result set.

2. The method of claim 1, wherein upon a determination that the one or more generated result sets do not include security data or information from one or more clients with a set anonymity value that is greater than the aggregated anonymity value, allowing access to or presenting the one or more generated result sets to the at least one client initiating the search request.

3. The method of claim 1, wherein removing the security data of each client whose anonymity value is greater than the aggregate anonymity score from the one or more generated result sets comprises creating one or more filtered result sets.

4. The method of claim 3, further comprising determining an aggregated anonymity score for the one or more filtered result sets, and comparing the aggregated anonymity score for each of the one or more filtered generated result sets to the anonymity value of each client whose security data remains therein.

5. The method of claim 1, wherein the search parameters include one or more indicators of compromise.

6. The method of claim 5, wherein the indicators of compromise comprise one or more IP addresses, an access time, an access date, an email address, a country of origin, a traffic type, a communication type, and/or combinations thereof.

7. The method of claim 1, further comprising:
setting or selecting one or more bounds for the recorded anonymity values; and
scaling one or more of the recorded anonymity values to correspond to the one or more selected or set bounds.

8. The method of claim 1, further comprising:
receiving security data from each client of the plurality of anonymous clients in the data base; and
aggregating the received security data in the one or more searchable data stores.

9. A system for global searching of aggregated security data of a plurality of disparate anonymous clients in a client base, comprising:
at least one memory configured to store one or more searchable data stores including the security data received from the plurality of clients of the client base; and
at least one processor operable to:
record at least one anonymity value for each client of the plurality of anonymous clients of the client base who have security data aggregated and included in the one or more searchable data stores, each of the anonymity values being representative of a tolerance or amount of risk that a client with security data on the one or more searchable data stores may be identified through searches or querying of the one or more searchable data stores;
receive a search request having one or more search parameters from at least one client of the plurality of anonymous clients, wherein the search parameters of the search request are configured for searching or querying of the security data in the one or more searchable data stores to facilitate identification of malicious actors or security threats, for initiating remediation or preventative action against the malicious actors or security threats, for development of applications or programs for threat prevention or identification of the malicious actors or security threats, or combinations thereof;
generate one or more result sets responsive to the received search request;
determine an aggregated anonymity score for each of the one or more generated result sets; and
compare the aggregated anonymity score for each of the one or more generated result sets with the anonymity value for each client of the plurality of anonymous clients of the client base; and
if the anonymity value of any of the clients is greater than the aggregated anonymity score, remove the security data of each client whose anonymity value is greater than the aggregate anonymity score of the one or more generated result sets.

10. The system of claim 9, wherein upon a determination that the one or more generated result sets do not include security data or information from one or more clients with a set anonymity value that is greater than the aggregated anonymity value, the processor is operable to allow access to or present the one or more generated result sets to the at least one client initiating the search request.

11. The system of claim 9, wherein removing the security data of each client whose anonymity value is greater than the aggregate anonymity score from the one or more generated result sets create one or more filtered result sets.

12. The system of claim 11, wherein the processor further is operable to determine an aggregated anonymity score for each of the one or more filtered result sets, and compare the aggregated anonymity score for each of the one or more filtered result sets to the anonymity value of each client whose security data remains therein.

13. The system of claim 9, wherein the search request includes one or more indicators of compromise including an IP address, an access time, an access date, an email address, a country of origin, a traffic type, a communication type, and/or combinations thereof.

14. The system of claim 9, wherein the processor is further operable to:
receive one or more set or selected bounds for the recorded anonymity values; and
scale one or more of the recorded anonymity values to correspond to the one or more set or selected bounds.

15. The system of claim 9, wherein the anonymity valves cannot be set below a selected threshold value.

16. The system of claim 15, wherein the anonymity valves are set above a threshold value.

17. The system of claim 9, wherein the search request includes a root or a compound search request.

18. The system of claim 9, further comprising one or more monitoring devices in communication with a networked system of at least one client of the plurality of anonymous clients, wherein in the one or more monitoring devices are operable to monitor the networked system and accumulate security data therefrom.

* * * * *